United States Patent
Wilson et al.

(10) Patent No.: US 7,407,006 B2
(45) Date of Patent: Aug. 5, 2008

(54) SYSTEM FOR LOGGING FORMATIONS SURROUNDING A WELLBORE

(75) Inventors: Paul Wilson, Houston, TX (US); Robert Malloy, Katy, TX (US); Stephen Senn, Conroe, TX (US); Tom Standley, Coldspring, TX (US); Robert Pitts, Houston, TX (US)

(73) Assignee: Weatherford/Lamb, Inc., Houston, TX (US)

( * ) Notice: Subject to any disclaimer, the term of this patent is extended or adjusted under 35 U.S.C. 154(b) by 346 days.

(21) Appl. No.: 11/112,530

(22) Filed: Apr. 22, 2005

(65) Prior Publication Data

US 2005/0211433 A1 Sep. 29, 2005

Related U.S. Application Data

(63) Continuation-in-part of application No. 11/026,963, filed on Dec. 30, 2004, which is a continuation-in-part of application No. 10/127,021, filed on Apr. 19, 2002, now Pat. No. 6,915,849, and a continuation-in-part of application No. 10/867,389, filed on Jun. 14, 2004, now Pat. No. 7,185,700, and a continuation-in-part of application No. 10/848,337, filed on May 18, 2004, now Pat. No. 7,000,692, and a continuation-in-part of application No. 10/999,818, filed on Nov. 30, 2004, now abandoned, and a continuation-in-part of application No. 10/068,555, filed on Feb. 6, 2002, now abandoned, and a continuation-in-part of application No. 09/225,029, filed on Jan. 4, 1999, now abandoned.

(60) Provisional application No. 60/285,891, filed on Apr. 23, 2001.

(51) Int. Cl.
*E21B 47/12* (2006.01)

(52) U.S. Cl. .................. 166/250.01; 166/66; 166/254.2

(58) Field of Classification Search ............ 166/250.01, 166/254.2, 66
See application file for complete search history.

(56) References Cited

U.S. PATENT DOCUMENTS

| | | | |
|---|---|---|---|
| 2,379,800 A | 7/1945 | Hare |
| 2,414,719 A | 1/1947 | Cloud |
| 2,469,461 A | 5/1949 | Russell |
| 2,469,463 A | 5/1949 | Russell |

(Continued)

FOREIGN PATENT DOCUMENTS

| | | |
|---|---|---|
| CA | 2335192 | 11/2001 |

(Continued)

OTHER PUBLICATIONS

PCT International Search Report, International Application No. PCT/US 03/02601, dated Jul. 22, 2003.

(Continued)

*Primary Examiner*—Hoang Dang
(74) *Attorney, Agent, or Firm*—Patterson & Sheridan, L.L.P.

(57) ABSTRACT

A system and method for logging a formation adjacent to a borehole. The system includes a conveyance member, a memory module in communication with the conveyance member, a communications module in communication with the memory module, and a logging tool in communication with the communications module, wherein the communications module is configured to facilitate communication between the memory module and the logging tool.

32 Claims, 3 Drawing Sheets

U.S. PATENT DOCUMENTS

| | | | |
|---|---|---|---|
| 2,470,743 A | 5/1949 | Hochgesang et al. | |
| 2,508,722 A | 5/1950 | Loesser | |
| 2,659,014 A | 11/1953 | Scherbatskoy | |
| 2,782,318 A | 2/1957 | Hersog | |
| 2,862,106 A | 11/1958 | Scherbatskoy | |
| 2,910,591 A | 10/1959 | Baker | |
| 2,933,609 A | 4/1960 | Norelius | |
| 2,949,535 A | 8/1960 | Scherbatskoy | |
| 2,993,994 A | 7/1961 | Herzog | |
| 3,071,687 A | 1/1963 | Youmans | |
| 3,090,031 A | 5/1963 | Lord | |
| 3,090,867 A | 5/1963 | Swanson | |
| 3,121,164 A | 2/1964 | Swift | |
| 3,147,378 A | 9/1964 | Hall, Jr. | |
| 3,151,242 A | 9/1964 | Hall, Jr. | |
| 3,219,820 A | 11/1965 | Hall, Jr. | |
| 3,240,937 A | 3/1966 | McKay | |
| 3,240,938 A | 3/1966 | Hall, Jr. | |
| 3,244,880 A | 4/1966 | Owen | |
| 3,247,377 A | 4/1966 | Hall, Jr. | |
| 3,265,893 A | 8/1966 | Rabson | |
| 3,413,472 A | 11/1968 | Caldwell | |
| 3,439,165 A | 4/1969 | Hopkinson | |
| 3,461,291 A | 8/1969 | Goodman | |
| 3,490,280 A | 1/1970 | Fields | |
| 3,532,884 A | 10/1970 | Dewan | |
| 3,559,905 A | 2/1971 | Palynchuk | |
| 3,564,248 A | 2/1971 | Hopkinson et al. | |
| 3,566,682 A | 3/1971 | Winkler, Jr. | |
| 3,611,799 A | 10/1971 | Davis | |
| 3,696,332 A | 10/1972 | Dickson et al. | |
| 3,755,782 A | 8/1973 | Haas et al. | |
| 3,772,513 A | 11/1973 | Hall, Jr. | |
| 3,780,301 A | 12/1973 | Smith, Jr. et al. | |
| 3,831,138 A | 8/1974 | Rammner | |
| 3,930,153 A | 12/1975 | Scott | |
| 3,988,581 A | 10/1976 | Peelman | |
| 4,002,903 A | 1/1977 | Pitts, Jr. | |
| 4,066,892 A | 1/1978 | Givens | |
| 4,095,865 A | 6/1978 | Denison et al. | |
| 4,226,116 A | 10/1980 | Denison | |
| 4,227,405 A | 10/1980 | West | |
| 4,320,800 A | 3/1982 | Upchurch | |
| 4,327,290 A | 4/1982 | Plasek | |
| 4,355,310 A | 10/1982 | Belaigues et al. | |
| 4,404,467 A | 9/1983 | Schweitzer | |
| 4,445,734 A | 5/1984 | Cunningham | |
| 4,457,370 A | 7/1984 | Wittrisch | |
| 4,459,480 A | 7/1984 | Dimon | |
| 4,460,038 A | 7/1984 | Clamens | |
| 4,490,788 A | 12/1984 | Rasmussen | |
| 4,510,797 A | 4/1985 | Guidry et al. | |
| 4,566,318 A | 1/1986 | Rao et al. | |
| 4,570,480 A | 2/1986 | Fontenot et al. | |
| 4,580,632 A | 4/1986 | Reardon | |
| 4,585,939 A | 4/1986 | Arnold et al. | |
| 4,605,268 A | 8/1986 | Meador | |
| 4,628,202 A | 12/1986 | Minette | |
| 4,645,926 A | 2/1987 | Randall | |
| 4,656,354 A | 4/1987 | Randall | |
| 4,682,657 A | 7/1987 | Crawford | |
| 4,695,955 A | 9/1987 | Faisandier | |
| 4,721,853 A | 1/1988 | Wraight | |
| 4,788,544 A | 11/1988 | Howard | |
| 4,790,378 A | 12/1988 | Montgomery et al. | |
| 4,794,336 A | 12/1988 | Marlow et al. | |
| 4,794,791 A | 1/1989 | Wittrisch | |
| 4,806,928 A | 2/1989 | Veneruso | |
| 4,833,320 A | 5/1989 | Hurlbut | |
| 4,883,956 A | 11/1989 | Melcher et al. | |
| 4,898,236 A | 2/1990 | Sask | |
| 4,901,069 A | 2/1990 | Veneruso | |
| 4,918,314 A | 4/1990 | Sonne | |
| 4,996,017 A | 2/1991 | Ethridge | |
| 5,010,764 A | 4/1991 | Taylor | |
| 5,019,978 A | 5/1991 | Howard et al. | |
| 5,042,297 A | 8/1991 | Lessi | |
| 5,053,620 A | 10/1991 | McKeon | |
| 5,080,175 A | 1/1992 | Williams | |
| 5,081,351 A | 1/1992 | Roscoe et al. | |
| 5,097,123 A | 3/1992 | Grau et al. | |
| 5,172,765 A | 12/1992 | Sas-Jaworsky et al. | |
| 5,184,682 A | 2/1993 | Delacour et al. | |
| 5,217,075 A | 6/1993 | Wittrisch | |
| 5,234,058 A | 8/1993 | Sas-Jaworsky et al. | |
| 5,279,366 A | 1/1994 | Scholes | |
| 5,348,097 A | 9/1994 | Giannesini et al. | |
| 5,351,531 A | 10/1994 | Kerr | |
| 5,394,141 A | 2/1995 | Soulier | |
| 5,410,152 A | 4/1995 | Gadeken | |
| 5,488,989 A | 2/1996 | Leising et al. | |
| 5,505,259 A | 4/1996 | Wittrisch et al. | |
| 5,530,359 A | 6/1996 | Habashy et al. | |
| 5,581,024 A | 12/1996 | Meyer, Jr. et al. | |
| 5,585,726 A | 12/1996 | Chau | |
| 5,608,214 A | 3/1997 | Baron et al. | |
| 5,608,215 A | 3/1997 | Evans | |
| 5,635,631 A | 6/1997 | Yesudas et al. | |
| 5,636,686 A | 6/1997 | Wittrisch | |
| 5,740,864 A | 4/1998 | De Hoedt et al. | |
| 5,749,417 A | 5/1998 | Delatorre | |
| 5,753,813 A | 5/1998 | Hagiwara | |
| 5,799,733 A | 9/1998 | Ringgenberg et al. | |
| 5,829,520 A | 11/1998 | Johnson | |
| 5,945,923 A | 8/1999 | Soulier | |
| 5,947,213 A | 9/1999 | Angle et al. | |
| 6,041,860 A | 3/2000 | Nazzal et al. | |
| 6,101,445 A | 8/2000 | Alvarado et al. | |
| 6,114,972 A | 9/2000 | Smith | |
| 6,157,761 A | 12/2000 | Wittrisch | |
| 6,173,773 B1 | 1/2001 | Almaguer et al. | |
| 6,173,787 B1 | 1/2001 | Wittrisch | |
| 6,177,882 B1 | 1/2001 | Ringgenberg et al. | |
| 6,179,058 B1 | 1/2001 | Wittrisch | |
| 6,218,959 B1 | 4/2001 | Smith | |
| 6,247,542 B1 | 6/2001 | Kruspe et al. | |
| 6,318,463 B1 | 11/2001 | Fehrmann et al. | |
| 6,459,263 B2 | 10/2002 | Hawkes et al. | |
| 6,516,663 B2 | 2/2003 | Wong | |
| 6,520,264 B1 | 2/2003 | MacKenzie et al. | |
| 6,575,241 B2 | 6/2003 | Widney et al. | |
| 6,649,906 B2 | 11/2003 | Adolph et al. | |
| 6,693,553 B1* | 2/2004 | Ciglenec et al. | 340/853.1 |
| 6,703,606 B2 | 3/2004 | Adolph | |
| 6,736,210 B2 | 5/2004 | Hosie et al. | |
| 6,777,940 B2* | 8/2004 | Macune | 324/338 |
| 2002/0170711 A1 | 11/2002 | Nuth | |
| 2003/0070842 A1 | 4/2003 | Balley et al. | |
| 2003/0090390 A1 | 5/2003 | Snider et al. | |
| 2003/0156494 A1 | 8/2003 | McDaniel et al. | |
| 2004/0146133 A1 | 7/2004 | Leung et al. | |

FOREIGN PATENT DOCUMENTS

| | | |
|---|---|---|
| EP | 0389345 | 3/1990 |
| EP | 0 685 628 | 12/1995 |
| EP | 0 930 518 A2 | 7/1999 |
| EP | 0952302 | 10/1999 |
| EP | 0 987 401 A2 | 3/2000 |
| FR | 2 621 072 | 3/1989 |
| FR | 2 652 160 | 3/1991 |
| GB | 1 595 449 | 8/1981 |
| GB | 2283035 | 4/1995 |
| GB | 2284625 | 6/1995 |

| | | |
|---|---|---|
| GB | 2346189 | 8/2000 |
| GB | 2 424 665 | 10/2006 |
| WO | WO 00/30299 | 5/2000 |
| WO | WO 01/65066 | 9/2001 |
| WO | WO 03/067828 | 8/2003 |

OTHER PUBLICATIONS

U.K. Examination Report, Application No. GB0417792.9, dated Feb. 23, 2005.

The Shale Compensated Chlorine Log, (SPE4511), P.F. McKinlay and H. L. Tanner, presented at SPE-AIME 1974.

Cased Hole Evaluation with Chlorine Log, (SPE13141) J. M. Deimel, D.G. Andrus, presented at SPE-AIME 1984.

PCT International Search Report from International application No. PCT/GB02/00286, Dated Apr. 12, 2002.

PCT International Search Report from International Application PCT/GB02/00240, dated Jun. 27, 2002.

U.S. Appl. No. 09/778,357, Filed Feb. 6, 2001, Arnold Wong, "Downhole Electromagnetic Logging Into Place Tool."

Wiltse, D.J., "Fishing Jobs Using Continuous Rod," Weatherford Artificial Lift System, Mar. 30, 1999, 1 Page.

C-Tech Energy, Inc., Premier Petroleum Wellbore Steel Design, Fabrication Products and . . . "Pro-Rod: Colled Rod Product Line" http://www.ctechenergy.com/ and http://www.ctechenergy.com/prorod_p.html Copyright 2001, 4 Pages.

PCT Partial International Search Report form International Application No. PCT/GB02/01827, dated Jul. 17, 2002.

PCT Written Opinion, International Application No. PCT/GB02/01827, dated Jun. 18, 2003.

Combine Search and Examination Report, Application No.:0607868.7, Dated Aug. 29, 2006.

GB Search Report, Application No. GB0607868.7, dated Jun. 27, 2007.

* cited by examiner

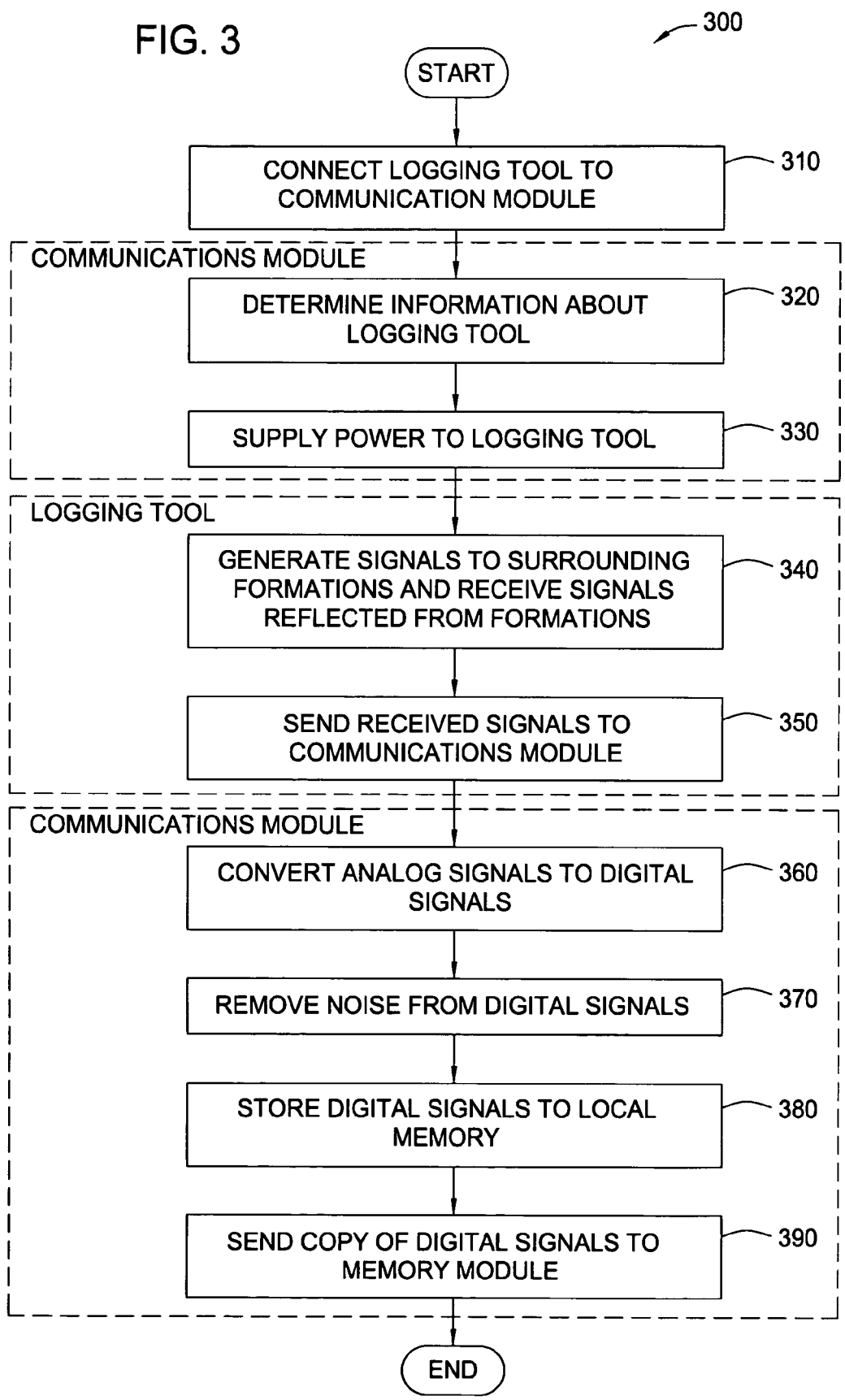

SYSTEM FOR LOGGING FORMATIONS SURROUNDING A WELLBORE

CROSS REFERENCE TO RELATED APPLICATIONS

This application is a continuation-in-part of U.S. patent application Ser. No. 11/026,963 filed Dec. 30, 2004, which is a continuation-in-part of (a) U.S. patent application Ser. No. 10/127,021, filed Apr. 19, 2002 now U.S. Pat. No. 6,915,849, which claims benefit of U.S. provisional patent application Ser. No. 60/285,891, filed Apr. 23, 2001; (b) U.S. patent application Ser. No. 10/867,389, filed Jun. 14, 2004 now U.S. Pat. No. 7,185,700; (c) U.S. patent application Ser. No. 10/848,337, filed May 18, 2004 now U.S. Pat No. 7,000,692, which claims benefit of U.S. Pat. No. 6,736,210, filed Feb. 6, 2001; (d) U.S. patent application Ser. No. 10/999,818, filed Nov. 30, 2004 now abandoned, which claims benefit of U.S. Pat. No. 6,825,459, filed Sep. 10, 2001 which was a continuation-in-part of U.S. patent application Ser. No. 09/225,029, filed Jan. 4, 1999 (now abandoned); and (e) U.S. patent application Ser. No. 10/068,555, filed Feb. 6, 2002 now abandoned. Each of the aforementioned related patent applications is incorporated herein by reference.

BACKGROUND OF THE INVENTION

1. Field of the Invention

Embodiments of the present invention generally relate to the operation of instrumentation within a wellbore, and more particularly, to a system and a method for conveying and operating tools into a wellbore.

2. Description of the Related Art

The production of hydrocarbons from sub-surface locations typically includes the drilling of a borehole into the earth in a location where hydrocarbons are likely to be found, physically isolating the borehole from the earth surrounding the borehole by the placement of casing therein, cementing the casing in place, and penetrating the casing at zones known (or suspected) to have producible quantities of hydrocarbons. This enables the hydrocarbons to flow into the casing and then be pumped or otherwise flowed to the surface.

The location of zones likely to produce hydrocarbons is often determined by passing a tool, commonly known as a logging tool, along the length of the borehole. The logging tool may be conveyed into the borehole using a conveyance member, such as an electric wireline, a slickline, a coiled tubing or a jointed pipe. Certain logging tools, such as spectral saturation tools and gamma ray tools, are configured to operate with a particular conveyance member, such as slickline. Other types of logging tools, such as segmented bond tools, casing collar locator tools and sondes described in U.S. Pat. No. 5,081,351 and wireline logging tools described in U.S. Pat. No. 5,608,215 (both of which are incorporated herein by reference), are configured to operate with another type of conveyance member, such as wireline. Thus, each time a user wants to change one logging tool that is conveyable with slickline to another logging tool that is conveyable with wireline, the user would have to change not only the logging tool, but also the conveyance member. Such practice can be cumbersome and time-consuming.

Therefore, a need exists in the art for an improved system and method for logging formations surrounding a wellbore.

SUMMARY OF THE INVENTION

Various embodiments of the invention are directed to a system for logging a formation adjacent to a borehole. The system includes a conveyance member, a memory module in communication with the conveyance member, a communications module in communication with the memory module, and a logging tool in communication with the communications module, wherein the communications module is configured to facilitate communication between the memory module and the logging tool.

Various embodiments of the invention are also directed to a method for facilitating communication between a logging tool and a memory module in connection with operating a logging system. The method includes receiving a connection signal from the logging tool and determining a power requirement for operating the logging tool and a filtering scheme for processing signals received from the logging tool.

Various embodiments of the invention are also directed to a method for operating a logging system. The method includes coupling a logging tool to a communications module, coupling the communications module to a memory module, coupling the memory module to a conveyance member, configuring the communications module for compatibility with the logging tool, sending analog signals from the logging tool to the communications module, wherein the analog signals contain information about one or more formations surrounding a wellbore and converting the analog signals to a format readable by the memory module.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 3 illustrates a flow diagram of a method for operating a logging system in accordance with one or more embodiments of the invention.

DETAILED DESCRIPTION

Figure 1:
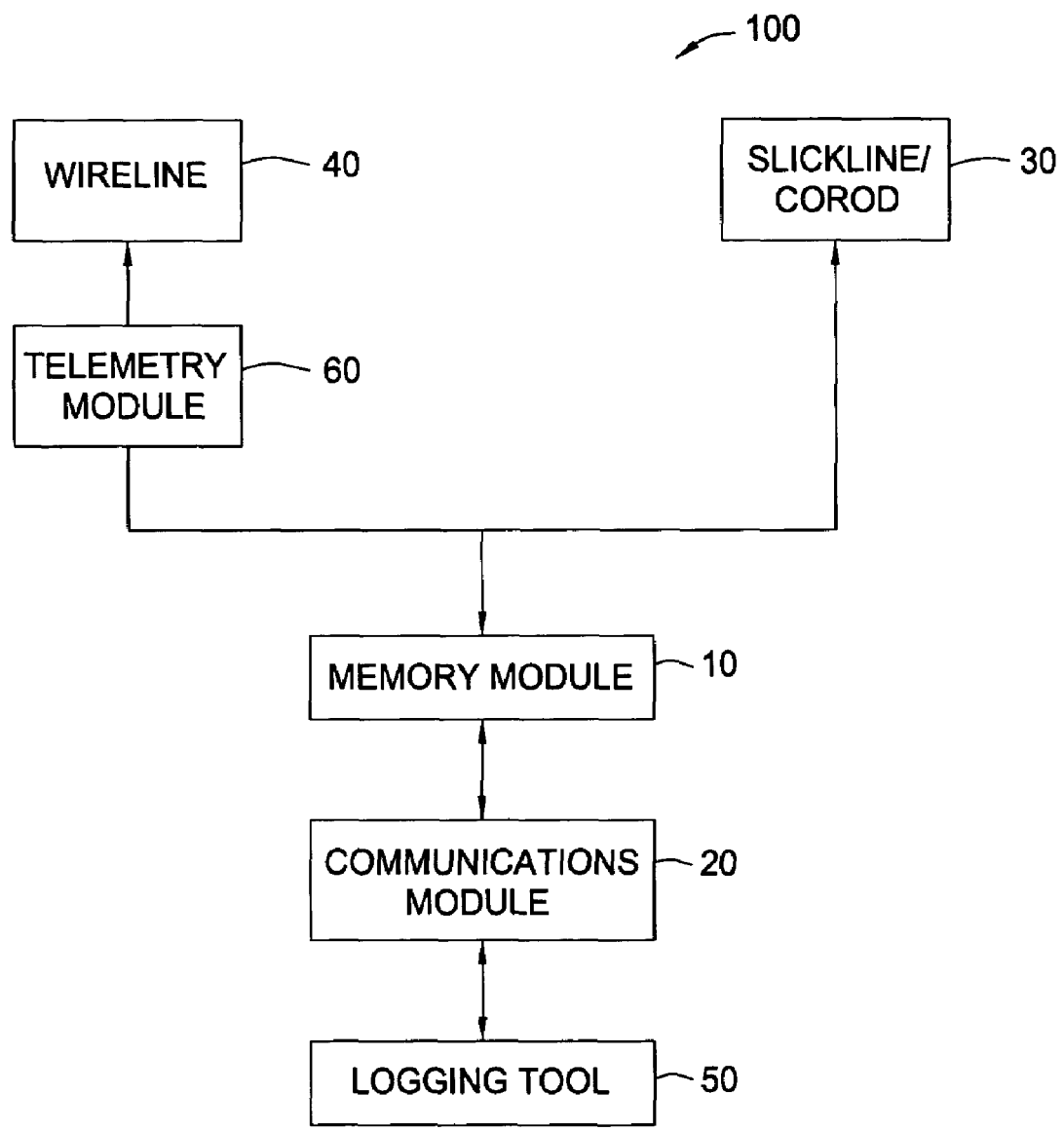
FIG. 1 illustrates a block diagram of a logging system in accordance with one or more embodiments of the invention.

FIG. 1 illustrates a block diagram of a logging system 100 in accordance with one or more embodiments of the invention. The logging system 100 may be used for measuring information about the formations that surround a wellbore. The logging system 100 includes a memory module 10 coupled to a communications module 20, which may often be referred to as a communications sub by persons of ordinary skill in the art. The memory module 10 may also be coupled to a slickline conveyance member 30 or a wireline conveyance member 40. The memory module 10 may be coupled to the wireline conveyance member 40 via a telemetry module 60. The term "coupled" as used in this application may be defined as in communication with and may involve any type of coupling, including mechanical, electrical and optical coupling.

Generally, the wireline conveyance member 40 is a multi-strand wire or cable for use in oil or gas wells. Wireline typically comprises at least a single insulated electrical conductor cable surrounded by a plurality of braided cables, which provide structural support for the single insulated electrical conductor cable during transport of the wireline into the wellbore.

Generally, the slickline conveyance member 30 is a single-strand non-conductive wire with an outer diameter between 3/16" to 3/8". The slickline can be made from a variety of materials, from mild steel to alloy steel. The slickline can be 10,000 feet or more in length. For larger sizes, a braided wire construction may be utilized. The braided wire, for all practical purposes, has similar functional characteristics as a solid wire. Such braided wire is therefore considered to be a slickline.

Although various embodiments of the invention are described with reference to the slickline conveyance member 30 or the wireline conveyance member 40, other embodiments may be used in connection with other types of conveyance member, such as a continuous reelable rod (COROD), jointed pipe and coiled tubing. A COROD string is typically made from a round cross section solid or near solid rod having for example a 3/4" outer diameter. While the outer diameter dimensions may vary, the relatively small diameter to thickness ratios of COROD are distinctive. For COROD with a small inner diameter such as 1/8" and an outer diameter of 1 1/8", the diameter to thickness ratio is about 2.25. If the inner diameter of such a 1 1/8" COROD were larger than 1/8", the diameter to thickness ratio would increase correspondingly. The diameter to thickness ratios for COROD is however significantly less than those for coiled tubing for which the ratios are typically 15 and higher. Unlike jointed sucker rod that is made in specific lengths and threaded at each end for sequential connection of those lengths, COROD is made in one continuous length and placed on a reel. Other details of COROD are described in commonly assigned U.S. patent application Ser. No. 11/026,963, filed Dec. 30, 2004, which is incorporated herein by reference.

The functionality of the memory module 10 may be determined according to whether the memory module 10 is connected to the slickline conveyance member 30 or the wireline conveyance member 40 (via the telemetry module 60). If the memory module 10 is configured to be used with the slickline conveyance member 30, the memory module 10 will function as a data collector. If the memory module 10 is configured to be used with the wireline conveyance member 40, the memory module 10 will function as a log backup. The telemetry module 60 is configured to poll the memory module 10 for log data and transmit the log data up the wireline to the surface computers for surface storage and data reduction.

The communications module 20 is coupled to a logging tool 50. The logging tool 50 may be any type of logging tools. For instance, the logging tool 50 could be a pulse neutron logging tool, a spectral saturation logging tool, a segmented bond logging tool or any other logging tool commonly known by persons of ordinary skill in the art.

The communications module 20 is configured to provide a communication link between the logging tool 50 and the memory module 10. The communications module 20 may be configured to facilitate communication between the memory module 10 and a variety of logging tools. The communications module 20 may also be configured to facilitate communication between the memory module 10 and a plurality of logging tools at the same time.

Figure 2:
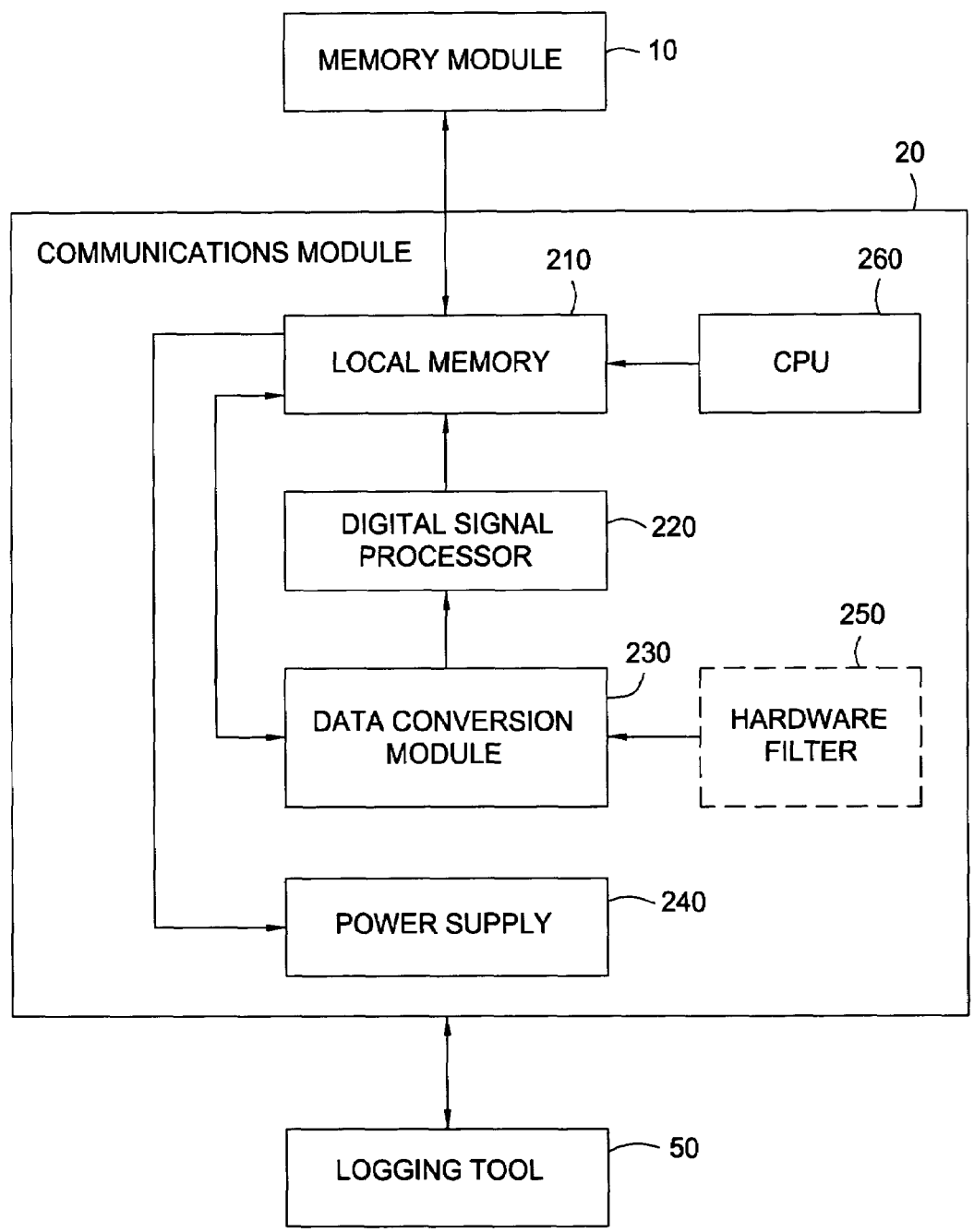
FIG. 2 illustrates the communications module in greater detail in accordance with one or more embodiments of the invention.

FIG. 2 illustrates the communications module 20 in greater detail in accordance with one or more embodiments of the invention. The communications module 20 may include a power supply 240, a data conversion module 230, a digital signal processor 220, a local memory 210, a central processing unit (CPU) 260 and a hardware filter 250. The power supply 240 may be configured to provide power to a logging tool connected to the communications module 20. The power supply 240 may also be configured to provide power to the memory module 10. Alternatively, the memory module 10 may have its own power supply.

The data conversion module 230 may be configured to convert analog signals containing information about formations surrounding the wellbore to a format (i.e., digital) readable by the memory module 10. The digital signal processor 220 may be configured to process the digital signals for the required information. The local memory 210 may be configured to store the digital signals. The local memory 210 may also include a library of power and filtration schemes/requirements sorted by tool identification numbers. The local memory 210 may also include computer programs that may be used by the CPU 260 in operating various embodiments of the invention. The CPU 260 may include one or more conventionally available microprocessors to perform various operations in accordance with one or more embodiments of the invention. The hardware filter 250 may be configured to filter analog signals that are transmitted from the logging tool to the data conversion module 230.

Although embodiments of the invention are described with reference to one communications module 20 operable with all types of logging tools, other embodiments contemplate the use of one communications module 20 for each type of logging tool.

FIG. 3 illustrates a flow diagram of a method 300 for operating a logging system in accordance with one or more embodiments of the invention. At step 310, the communications module 20 is connected to a logging tool. The logging tool may be a pulse neutron logging tool, a spectral saturation logging tool, a segmented bond logging tool or any other logging tool commonly known by persons of ordinary skill in the art. For example, the logging tool may include a Penning ion source, such as the type described in U.S. Pat. No. 4,996,017, entitled NEUTRON GENERATOR TUBE, issued Feb. 26, 1991 to D. Ray Ethridge, which is incorporated herein by reference. As such, the pulsed neutron generator may operate at a frequency between about 500 Hz to about 30 kHz. The logging tool may also include scintillation detectors, which may include a gadolinium-containing material, such as gadolinium orthosilicate that is suitably doped, for example with cerium, to activate for use as a scintillator.

Once the logging tool is connected to the communications module 20, the communications module 20 is able to determine a set of information about the logging tool (step 320). For example, the set of information may include a tool identification number, a power scheme required to operate the logging tool and a filtration scheme for processing signals received from the logging tool.

In one embodiment, the set of information may be determined by having the communications module 20 send a query signal to the logging tool. Upon receipt of the query signal, the logging tool returns a tool identification number to the communications module 20. The communications module 20 then uses the tool identification number to determine the power scheme requirement and the filtration scheme for the logging tool. In making that determination, the communications module 20 may use a library that contains power and filtration schemes for various logging tools. The library may be part of the local memory 210. The filtration schemes contemplated by embodiments of the invention may include requirements for time truncating the signals, removing irrelevant signals, identifying relevant signals based on frequency and amplitude, and filtering out dead time. For example, one filtration scheme may filter out all signals having frequency that are outside of the 500 Hz to 30 kHz range. In this manner, the communications module 20 may be configured for compatibility with the logging tool 50.

In another embodiment, the set of information may be determined by having the communications module 20 send a query signal to the logging tool. Upon receipt of the tool identification number, the communications module 20 communicates with the memory module 10 to determine the appropriate power and filtration schemes for the logging tool.

In the event that no tool identification number is provided to the communications module 20, the tool identification number along with the power and filtration schemes may be provided manually by a user.

In one or more embodiments, the tool identification number may be retrieved from an identification computer chip disposed on the logging tool. The identification chip may be attached to the logging tool by solder or any other means commonly known by persons of ordinary skill in the art.

At step 330, the power supply 240 supplies power to the logging tool. The amount of power supplied to the logging tool may be based on the power requirement for that particular logging tool. The amount of power may vary according to the type of logging tool.

Upon receipt of power from the communications module 20, the logging tool generates signals to the formations surrounding a wellbore and receives the signals emanating from the formations (step 340). The signals may be generated continuously or periodically according to the type of logging tool. The logging tool then sends the received signals to the data conversion module 230 (step 350). The signals may be forwarded to the data conversion module 230 as soon as the signals are received or on a periodic basis. Generally, the received signals are in analog format.

Upon receipt of the analog signals from the logging tool, the data conversion module 230 converts the analog signals to a format readable by the memory module (step 360). The analog signals may be converted using one or more of the above referenced filtration schemes. In one embodiment, the analog signals are converted to digital signals, which may commonly be referred to as digital data by persons of ordinary skill in the art.

In one embodiment, irregularities that are typically caused by noise may be removed from the digital signals (step 370). As such, the data conversion module 230 may forward the digital signals to the digital signal processing (DSP) 220, which removes the irregularities that are typically caused by noise, thereby leaving only the relevant portions of the digital signals. The DSP 220 then sends the relevant portions of the digital signals to the local memory 210 (step 380).

The memory module 10 is configured to periodically poll the local memory 210 for the digital signals. Upon receipt of the request from the memory module 10, a copy of the digital signals is transferred to the memory module 10 (step 380). The digital signals may then be used by a data acquisition member to correlate data from the depth encoder reading to define data points at various locations in the wellbore. This information may then be used to form a log of measured data as a function of depth within the wellbore at which the signals were recorded.

In one embodiment, a hardware filter 250 may be disposed on a path between the logging tool and the data conversion module 230. The hardware filter 250 may be used to filter the analog signals that are being transmitted from the logging tool to the data conversion module 230. The analog signals may be filtered based on frequency or voltage requirements. The hardware filter 250 may be used in lieu of or in addition to the above referenced filtration schemes used by the data conversion module 230.

While the foregoing is directed to embodiments of the present invention, other and further embodiments of the invention may be devised without departing from the basic scope thereof, and the scope thereof is determined by the claims that follow.

What is claimed is:

1. A system for logging a formation adjacent to a borehole, comprising:
    a conveyance member;
    a memory module in communication with the conveyance member;
    a communications module in communication with the memory module, wherein the communications module includes local memory with a library of power and filtration schemes for various logging tools; and
    a logging tool in communication with the communications module, wherein the communications module is configured to facilitate communication between the memory module and the logging tool by querying the logging tool for identification data used to select one of the power and filtration schemes.

2. The system of claim 1, wherein the communications module is configurable to facilitate communication between the memory module and a variety of logging tools.

3. The system of claim 1, wherein the communications module is configured to facilitate communication between the memory module and a plurality of logging tools at the same time.

4. The system of claim 1, wherein the conveyance member is a wireline conveyance member.

5. The system of claim 1, wherein the conveyance member is a slickline conveyance member.

6. The system of claim 1, wherein the conveyance member is a continuous, reelable rod.

7. The system of claim 1, wherein the conveyance member is a coil tubing.

8. The system of claim 1, wherein the communications module is configured to receive analog signals from the logging tool, wherein the analog signals contain information about the formation adjacent to the borehole.

9. The system of claim 8, wherein the communications module is further configured to convert the analog signals to digital signals readable by the memory module.

10. The system of claim 9, wherein the communications module is further configured to transfer the digital signals to the memory module.

11. The system of claim 9, wherein the memory module is configured to periodically poll the communications module for the digital signals.

12. The system of claim 1, wherein the memory module functions as a log backup.

13. The system of claim 1, wherein the communications module comprises a power supply for providing power to the logging tool.

14. The system of claim 8, wherein the communications module comprises a data conversion module for converting the analog signals to a format readable by the memory module.

15. The system of claim 8, wherein the communications module comprises a data conversion module for converting the analog signals to digital signals readable by the memory module.

16. The system of claim 15, wherein the communications module comprises a digital signal processor for removing irregularities from the digital signals.

17. The system of claim 15, wherein the communications module comprises a local memory for storing the digital signals.

18. The system of claim 8, wherein the communications module comprises a hardware filter for filtering the analog signals from the logging tool.

19. The system of claim 1, wherein the logging tool comprises one or more scintillation detectors and a pulsed neutron generator having a Penning ion source.

20. The system of claim 19, wherein the pulsed neutron generator operates at a frequency between about 500 Hz to about 30 kHz.

21. A method for operating a logging system, comprising:
providing a logging tool, a communications module, a memory module, and a conveyance member that are coupled to form the logging system;
receiving a connection signal from the logging tool;
determining, based on the connection signal, a power requirement for operating the logging tool and a filtering scheme for processing signals received from the logging tool;
configuring the communications module for compatibility with the logging tool;
sending analog signals from the logging tool to the communications module, wherein the analog signals contain information about one or more formations surrounding a wellbore; and
converting the analog signals to a format readable by the memory module.

22. The method of claim 21, further comprising supplying power to the logging tool according to the power requirement.

23. The method of claim 21, further comprising converting the analog signals to digital signals readable by the memory module.

24. The method of claim 23, further comprising removing irregularities from the digital signals.

25. The method of claim 24, wherein the irregularities are removed using a digital signal processor.

26. The method of claim 23, further comprising storing the digital signals to a local memory.

27. The method of claim 26, further comprising transferring a copy of the digital signals from the local memory to the memory module.

28. The method of claim 21, further comprising querying the logging tool for identification data.

29. A method for operating a logging system, comprising:
coupling a logging tool to a communications module;
coupling the communications module to a memory module;
coupling the memory module to a conveyance member;
configuring the communications module for compatibility with the logging tool, wherein configuring the communications module for compatibility comprises querying the logging tool for identification data used to select a power and filtration scheme from a library that forms part of the communications module;
sending analog signals from the logging tool to the communications module, wherein the analog signals contain information about one or more formations surrounding a wellbore; and
converting the analog signals to a format readable by the memory module.

30. The method of claim 29, wherein converting the analog signals comprises converting the analog signals to digital signals.

31. The method of claim 29, further comprising transferring the digital signals to the memory module.

32. The method of claim 29, further comprising removing irregularities from the digital signals using a digital signal processor.

* * * * *